United States Patent [19]

Thomas

[11] Patent Number: 5,382,338

[45] Date of Patent: Jan. 17, 1995

[54] PHOTOVOLTAIC ELECTRICFIELD GAS RECOVERY METHOD

[76] Inventor: Tony Thomas, 435 Schwartz Ave., Baltimore, Md. 21212

[21] Appl. No.: 136,466

[22] Filed: Oct. 14, 1993

[51] Int. Cl.$^6$ .............................. H05F 3/00
[52] U.S. Cl. ..................... 204/164; 588/238; 588/244
[58] Field of Search ................ 204/164; 588/238, 244

[56] References Cited

U.S. PATENT DOCUMENTS 4,367,211 1/1983 Ray ........................... 204/164

Primary Examiner—John Niebling
Assistant Examiner—Kishor Mayekar

[57] ABSTRACT

A process for reduction of waste flue gases in an electricfield, as well as producing products, in the form of methane, methanol, nitrogen gas, carbon, and sulphur.

2 Claims, 1 Drawing Sheet 1. denotes semiconductor wafer or photovoltaic cell 2. denotes external direct current source 3. denotes hydrogen gas 4. denotes waste gas(es) nox, sox, co, or co2.

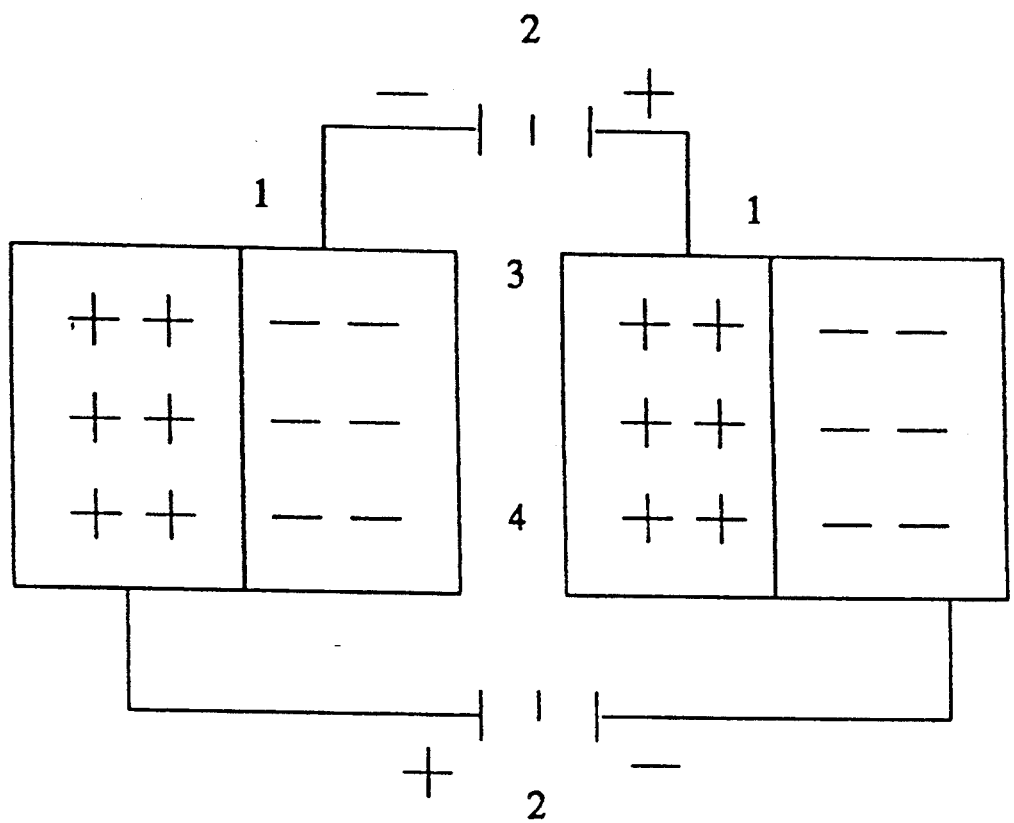
1. denotes semiconductor wafer or photovoltaic cell
2. denotes external direct current source
3. denotes hydrogen gas
4. denotes waste gas(es) nox, sox, co, or co2.

PHOTOVOLTAIC ELECTRICFIELD GAS RECOVERY METHOD

FIELD BACKGROUND OF THE INVENTION

This invention is a means of reduction of NOx, CO, CO2 & SOx waste gases. This is done with doped semiconductors such as silicon doped with phosphorus to produce a n-type or negative semiconductor. Silicon doped with boron would produce a positive semiconductor. These would be used as plates to produce an electricfield, with the use of an applied direct current. The binding together of n-type and p-type will produce a photovoltaic device. This a conventional process. But the use of two of the device as plates for an electricfield for chemical reduction process is not.

There have been several ways to reduce waste gas proposed in the past. U.S. Pat. No. 4,367,211 to Ray discloses the electrochemical reduction of CO2 and/or CO to hydrocarbons utilizing a solid hydrogen ion conducting polymer electrolyte. U.S. Pat. No. 4,787,964 to Gordon et al. discloses a multi-phase electrode which include a fluid electrolyte a gaseous layer and a porous body separating the two. These electrodes further incorporate platinum or porphoryns, and are useful for the reduction process in the presence of hydrogen.

SUMMARY OF THE INVENTION

It is possible to reduce the waste gases from flues with hydrogen in an electric-field. The process will convert NOx to nitrogen gas. This process convert CO to carbon or methanol. This process will convert CO2 to methane. This process will convert SOx to solid sulfur.

DESCRIPTION OF DRAWINGS

The sole FIGURE shows schematically an apparatus suitable for use in the present invention for the reduction of waste flue gases with hydrogen by applying an electric field across two photovoltaic cells.

DESCRIPTION OF THE INVENTION

The process of this invention utilized an electric field for the conversion of flue gases to useful products. This is done with the use of photovoltaic cells. Two cells (1), as shown in the Figure, are connected to an external direct current source (2). The external direct current must have a voltage potential of fourteen (14) volts are greater. The photovoltaic cells (1) are in a nonelectrical conducting container. The two photovoltaic cells are positioned (1) as parallel plates. The position of the photovoltaic cells (1) and the external direct current source (2) will generate an electric field.

Hydrogen gas will be in the electric field generated by the photovoltaic cells (1) and the external voltage (2). The ionization potential of hydrogen (3) is about 14 volts. The hydrogen will be converted into a plasma. Under the hydrogen (3) will be flue gases, or waste gases (4). The hydrogen plasma will react with the waste gases (4).

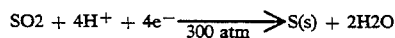

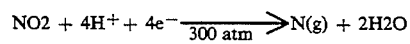

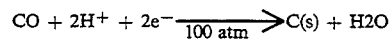

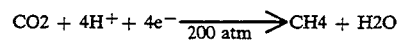

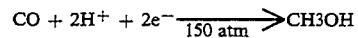

The above is one way waste gases (4) are converted into product when hydrogen (3) is converted into a plasma in an electric field.

Conventional methods use electrolytes to react with hydrogen for conversion of hydrogen into ions. Hydrogen gas in contact with hydrochloric acid (a hydrogen ion containing electrolyte) and a platinum electrode will cause hydrogen gas to oxidize.

$$H_2 \rightarrow 2H^+ + 2e^-$$

This invention does not depend on hydrogen ion in an electrolyte.

This invention turn hydrogen into a plasma as one of the route of reaction. Another means of reacting will be at the p-type positive side of the photovoltaic (1) cell. This reaction could take place also if positive semiconductor wafer was in the container as a single wafer instead of being binding into a photovoltaic cell (1). The anode of the direct current source (2) is connected to the p-type semiconductor of the photovoltaic cell (1). The hydrogen electron will experience an attraction for the positive charge and p-type will absorb the electron. When one mole of hydrogen ions are produce it will cause the ionization avalanche of other hydrogen gas elements. Ionization of the hydrogen gas by this reaction with flue gases will also give products of nitrogen gas, solid sulphur, carbon, methane, and methanol.

Another means of reaction will be at the n-type semiconductor wafer of the photovoltaic cell (1). The flue gases such as $NO_x$ will be in contact with n-type plate with negative ion flowing all over, the n-type semiconductor plate. The electron will be excited in the flue gases by the electrons in and on the n-type semiconductor plate. The excited electrons will be attracted by the positive p-type semiconductor plate. The absorption of the excited electron at the p-type semiconductor will cause the flue gases to be reduced.

I claim:

1. A process for the reduction of $NO_x$, $SO_x$, CO or $CO_2$ waste flue gas with hydrogen in an electric field, which process comprises the steps of
   a) positioning two photovoltaic cells as two parallel plates in a nonelectric conducting container, said photovoltaic cell is a binding together of n-type and p-type semiconductors;
   b) contacting a gas stream containing the flue gas with a hydrogen gas;
   c) applying a voltage of 14 V or greater across said photovoltaic cells to generate an electric field wherein the hydrogen gas is converted into plasma and the hydrogen plasma reduces the waste gas.

2. The process of claim 1, wherein the conversion of the hydrogen gas into plasma is at the p-type semiconductor of the photovoltaic cells.

* * * * *